United States Patent [19]

Fabris

[11] Patent Number: 5,181,885
[45] Date of Patent: Jan. 26, 1993

[54] JOINT STRUCTURE FOR CONNECTING A DRIVING STEERABLE WHEEL HUB TO AN AXLE, PARTICULARLY FOR AGRICULTURAL TRACTORS

[75] Inventor: Armando A. Fabris, Campodarsego, Italy

[73] Assignee: Carraro SpA, Campodarsego, Italy

[21] Appl. No.: 653,532

[22] Filed: Feb. 11, 1991

[30] Foreign Application Priority Data

May 11, 1990 [IT] Italy ................. 41595 A/90

[51] Int. Cl.⁵ ............................... F16D 3/84
[52] U.S. Cl. ......................... 464/170; 403/335
[58] Field of Search ............ 464/170, 171, 185; 403/335, 336, 337, 23

[56] References Cited

U.S. PATENT DOCUMENTS 1,880,098  9/1932  Mair ................. 403/335 X
4,026,124  5/1977  Toyokuni et al. ........ 403/57 X

FOREIGN PATENT DOCUMENTS 58-94634  6/1983  Japan ................. 464/170

Primary Examiner—Daniel P. Stodola
Assistant Examiner—Tony A. Gayoso
Attorney, Agent, or Firm—Sughrue, Mion, Zinn, Macpeak & Seas

[57] ABSTRACT

A structure interlinking the axle (2) with the hubs (3) of steering drive wheels, particularly for use on such agricultural machines as tractors and the like, comprising two cup-shaped bodies (4,5) respectively unitary with the axle and the wheel hub. The cup-shaped bodies are face coupled together in a relationship of relative rotation about the steering axis of the wheel by respective helical threadways (19, 20) having a coincident axis (X—X) with the steering axis.

6 Claims, 2 Drawing Sheets

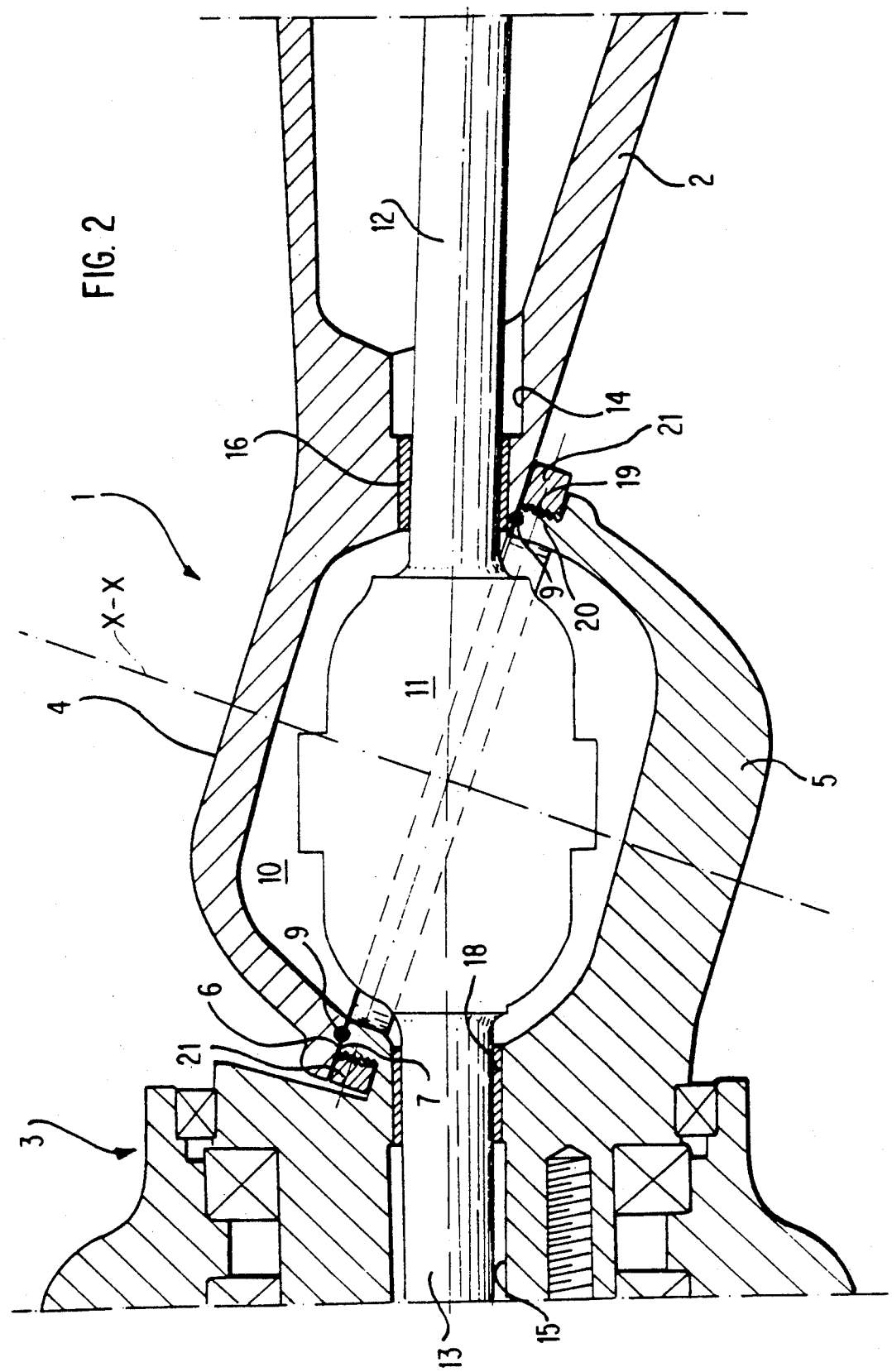

JOINT STRUCTURE FOR CONNECTING A DRIVING STEERABLE WHEEL HUB TO AN AXLE, PARTICULARLY FOR AGRICULTURAL TRACTORS

BACKGROUND OF THE INVENTION

This invention relates to a structure interlinking the axle with the hubs of steering drive wheels, particularly for use on agricultural tractors, which comprises two cup-shaped bodies, being respectively unitary with the axle and the hub and face coupled together in a relationship of relative rotation about the steering axis of the wheel, said cup-shaped bodies defining, on the interior thereof, a sealed cavity wherethrough the drive means to the hub is passed.

In accordance with the prior art described in Italian Patent Application No. 41600-A/89 by this same Applicant, the face coupling of the two cup-shaped bodies is provided by two bracket-like retaining formations being connected, the one to the axle by screw fasteners, and the other to the body of the wheel hub, also by screw fasteners.

Between the brackets and the respective, oppositely located cup-shaped bodies, according to the prior art of the above-noted document, there are placed thrust and rotation elements, usually plain bearing assemblies adapted to create rotary spindles whose axes coincide with the steering axis of the wheel.

The structure of the above-noted prior art, while being satisfactory under the aspect of providing a virtually sealed cavity between the cup-shaped bodies which can enclose an equal-velocity joint for transferring the motion to the wheel hub, still has the drawback that it allows mud and dirt to enter the interspaces that form of necessity between the mounting brackets for the cup-shaped bodies, with consequent likelihood of the bearing members becoming jammed which define the wheel steering axis between said brackets and their respective cup-shaped bodies.

A further drawback that appears in a structure according to the aforementioned prior art originates from a considerable concentration of loads on the rotary drive connection members between the brackets and the cup-shaped bodies, which are subjected, therefore, to considerable wear and potential failure. Nonetheless, assembling such a structure is a relatively complex, and hence expensive, operation.

SUMMARY OF THE INVENTION

It is the object of this invention to provide a structure interlinking the axle with the hub, particularly of steering drive wheels, which is fully amphibian, and suits accordingly machines which are also intended for operation on boggy soil, while having features of reduced potential failure of mechanical members as a result of a high load concentration.

The invention object is achieved by a structure as indicated being characterized as in the appended claims.

BRIEF DESCRIPTION OF THE DRAWINGS

The invention will be now described in detail with reference to a preferred embodiment thereof, shown by way of non-limitative example in the accompanying drawings, where:

FIG. 2 is a cross-sectional view showing schematically the interlinking structure of the preceding figure.

DETAILED DESCRIPTION OF THE INVENTION

Figure 1:
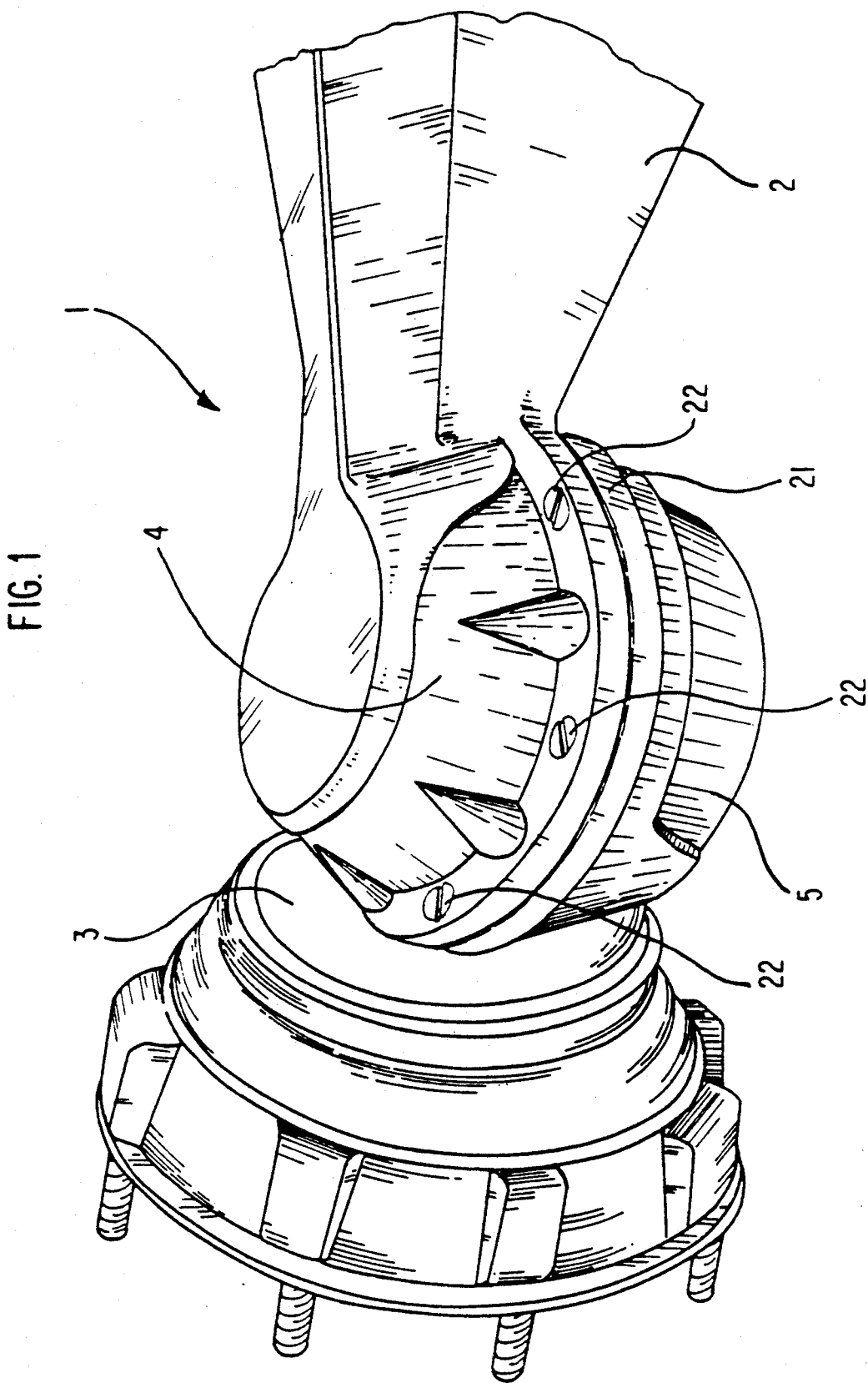
FIG. 1 is a schematic perspective view of the exterior of a structure according to the invention.

With reference to the above-listed drawing figures, the structure of this invention is shown generally at 1.

It establishes a link or connection between the axle 2 of an agricultural machine, not shown, and the hub 3 of a steering drive wheel, also not shown.

The structure 1 comprises two cup-shaped bodies 4 and 5, with a first of which is unitary with the axle 2 and the second is unitary with the hub 3.

The cup-shaped bodies 4 and 5 are arranged to face each other in frontal relationship at the locations of their edges 6 and 7, wherebetween a toroidal seal 9 is inserted.

The bodies 4 and 5 form, therefore, a sealed cavity 10 which accommodates an equal-velocity joint therein, which is known per se and indicated at 11, to interlink drive shafts 12 and 13 arranged to enter the cavity 10 through respective passageways 14 and 15 which also house respective plain or rolling bearings 16 and 18.

The face coupling for the cup-shaped bodies 4 and 5 is accomplished, according to the invention, with the intermediary of threadways 19 and 20, the last-mentioned one being formed directly on the free end 7 of the body 5.

The threadway 19 is instead formed on the inside surface of a ring-like element 21, made of a material having anti-friction properties, specifically bronze, which is made unitary with the end 6 of the cup-shaped body 4.

The ring-like element 21 is attached to the body 4 by means of screw fasteners 22.

It should be noted that the axis of the threadways 19 and 20 will define the preset steering axis X—X for the wheel associated with the hub 3.

As may be appreciated from the foregoing description, the steering action of the wheel connected to the hub 3 will bring about an angular displacement of the cup-shaped body 5 relatively to the cup-shaped body 4 with a movement over their respective threadways 20 and 19 which, for the functional purposes of the structure according to the invention, should not be tightened down together.

In view of that the steering range of the wheel associated with the hub 3 will not exceed one fourth of a revolution on each side from the neutral position, the threadways 19 and 20 will produce axial displacements tending to move the bodies 4 and 5 by a limited amount toward and away from each other, depending, of course, on the pitch length of their respective threadways, but without creating sealing problems within the cavity 10.

The axial displacements between the facing ends 6 and 7 of the bodies 4 and 5 are compensated for, in fact, by the expansion and contraction of the toroidal sealing member 9.

The interfit of the threadways 19 and 20 requires no lubrication because, as previously remarked, at least the threadway 19 is formed on an anti-friction material.

In addition, the threadways 19 and 20 allow the loads to be distributed over quite a large surface, with attendant advantages from the standpoints of strength and durability.

The structure of this invention is also advantageous from an economical standpoint, since it only comprises a few mechanical parts and can do with a much simplified assembly procedure over that incorporating rolling means for forming the steering axis which are inter alia made usually of materials apt to become rusty.

The dimensions of the component parts of the inventive structure may obviously be varied without departing, by so doing, from the invention scope as described hereinabove and claimed hereinafter.

I claim:

1. A structure interlinking an axle (2) with a hub (3) of a steering drive wheel, particularly for use with agricultural machines, which comprises two cup-shaped bodies (4,5) being respectively unitary with the axle and the hub and face coupled together in a relationship of relative rotation about a steering axis of the wheel, said cup-shaped bodies defining, on the interior thereof, a sealed cavity (10) through which a driving means extends wherein the face coupling for said cup-shaped bodies is provided by helical threadways (19,20) carried on said bodies and having a threadway axis (X—X) coincident with the steering axis of the wheel.

2. A structure according to claim 1, characterized in that the threadway carried on at least one of said cup-shaped bodies (4,5) is formed on a ring-like element (21) inserted on the edge of its respective cup-shaped body (4) and secured thereon.

3. A structure according to claim 2, characterized in that said threaded ring-like element (21) is inserted and secured on that cup-shaped body (4) which is unitary with the axle (2).

4. A structure according to claim 2, characterized in that said threaded ring-like element (21), inserted on the edge of at least one of said cup-shaped bodies, is composed of a material having anti-friction qualities.

5. A structure according to claim 4, characterized in that said material having anti-friction qualities is bronze.

6. A structure according to claim 1, characterized in that it comprises sealing means (9) interposed between said cup-shaped bodies (4,5) at the locations of said threadways (19,20).

* * * * *